United States Patent
An et al.

(10) Patent No.: US 10,257,539 B2
(45) Date of Patent: Apr. 9, 2019

(54) METHOD FOR SUB-PU MOTION INFORMATION INHERITANCE IN 3D VIDEO CODING

(71) Applicant: HFI Innovation Inc., Zhubei, Hsinchu County (TW)

(72) Inventors: Jicheng An, Beijing (CN); Kai Zhang, Beijing (CN); Jian-Liang Lin, Su'ao Township, Yilan County (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 147 days.

(21) Appl. No.: 15/114,116

(22) PCT Filed: Jan. 27, 2015

(86) PCT No.: PCT/CN2015/071606
§ 371 (c)(1),
(2) Date: Jul. 26, 2016

(87) PCT Pub. No.: WO2015/110084
PCT Pub. Date: Jul. 30, 2015

(65) Prior Publication Data
US 2016/0366441 A1    Dec. 15, 2016

(30) Foreign Application Priority Data

Jan. 27, 2014    (WO) ............... PCT/CN2014/071576

(51) Int. Cl.
*H04N 19/00*    (2014.01)
*H04N 19/597*    (2014.01)
(Continued)

(52) U.S. Cl.
CPC ......... *H04N 19/597* (2014.11); *H04N 19/105* (2014.11); *H04N 19/139* (2014.11);
(Continued)

(58) Field of Classification Search
CPC .... H04N 19/527; H04N 19/105; H04N 19/52; H04N 19/597; H04N 19/30; H04N 19/176; H04N 19/182; H04N 19/187
See application file for complete search history.

(56) References Cited

U.S. PATENT DOCUMENTS

| | | | |
|---|---|---|---|
| 5,793,985 A * | 8/1998 | Natarajan | H04N 19/51 375/240.01 |
| 2006/0088211 A1 * | 4/2006 | Kusakabe | G06T 5/002 382/167 |

(Continued)

FOREIGN PATENT DOCUMENTS

| | | |
|---|---|---|
| CN | 101911700 | 12/2010 |
| CN | 102356637 | 2/2012 |

(Continued)

OTHER PUBLICATIONS

Chen, Y., et al.; "Proposed text for JCT3V-G0119 based on 3D-HEVC Draft Text 2;" Joint Collaborative Team on 3D Video Coding Extensions of ITU-T SG 16 WP 3 and ISO/IEC JTC 1/SC 29/WG 11; Jan. 2014; pp. 1-5.

(Continued)

*Primary Examiner* — Frank F Huang
(74) *Attorney, Agent, or Firm* — Oblon, McClelland, Maier & Neustadt, L.L.P.

(57) ABSTRACT

A method and apparatus for coding a depth block in three-dimensional video coding are disclosed. Embodiments of the present invention divide a depth block into depth sub-blocks and determine default motion parameters. For each depth sub-block, the motion parameters of a co-located texture block covering the center sample of the depth sub-block are determined. If the motion parameters are available, the motion parameters are assigned as inherited motion parameters for the depth sub-block. If the motion parameters are unavailable, the default motion parameters (Continued)

are assigned as inherited motion parameters for the depth sub-block. The depth sub-block is then encoded or decoded using the inherited motion parameters or a motion candidate selected from a motion candidate set including the inherited motion parameters. The depth block may correspond to a depth prediction unit (PU) and the depth sub-block corresponds to a depth sub-PU.

16 Claims, 3 Drawing Sheets

(51) Int. Cl.
  *H04N 19/52* (2014.01)
  *H04N 19/436* (2014.01)
  *H04N 19/105* (2014.01)
  *H04N 19/139* (2014.01)
  *H04N 19/176* (2014.01)

(52) U.S. Cl.
  CPC ......... *H04N 19/176* (2014.11); *H04N 19/436* (2014.11); *H04N 19/52* (2014.11)

(56) References Cited

U.S. PATENT DOCUMENTS

| | | | |
|---|---|---|---|
| 2007/0183675 A1* | 8/2007 | Morohashi | H04N 19/176 382/239 |
| 2008/0123738 A1* | 5/2008 | Katsavounidis | H04N 19/159 375/240.01 |
| 2009/0003714 A1* | 1/2009 | Subramaniam | H04N 19/176 382/232 |
| 2009/0034616 A1* | 2/2009 | Abe | G06T 9/004 375/240.12 |
| 2009/0125291 A1* | 5/2009 | Mohandas | G06T 7/00 703/13 |
| 2010/0034480 A1* | 2/2010 | Rao | G06T 5/20 382/261 |
| 2010/0284466 A1 | 11/2010 | Pandit et al. | |
| 2011/0069760 A1 | 3/2011 | Lee et al. | |
| 2011/0273529 A1 | 11/2011 | Lai et al. | |
| 2012/0128244 A1* | 5/2012 | Singh | G06K 9/40 382/167 |

FOREIGN PATENT DOCUMENTS

WO    WO 2010/043773        4/2010
WO    WO 2013/139250 A1     9/2013

OTHER PUBLICATIONS

Liu, H., et al.; "CE1: Simplifications to sub-PU level inter-view motion prediction;" Joint Collaborative Team on 3D Video Coding Extensions of ITU-T SG 16 WP 3 and ISO/IEC JTC 1/SC 29/WG 11; Jan. 2014; pp. 1-4.

He, L., et al.; "Enhanced motion parameter inheritance for depth coding in 3D-HEVC;" Joint Collaborative Team on 3D Video Coding Extensions of ITU-T SG 16 WP 3 and ISO/IEC JTC 1/SC 29/WG 11; Jul.-Aug. 2013; pp. 1-4.

International Search Report dated Apr. 28, 2015, issued in application No. PCT/CN2015/071606.

Chen, Y., et al.; "CE2: Sub-PU based MPI;" Joint Collaborative Team on 3D Video Coding Extensions of ITU-T SG 16 WP 3 and ISO/IEC JTC 1/SC 29/WG 11; 7th Meeting: San José; US, Document: JCT3V-G0119; Jan. 11-17, 2014; pp. 1-3.

* cited by examiner

METHOD FOR SUB-PU MOTION INFORMATION INHERITANCE IN 3D VIDEO CODING

CROSS REFERENCE TO RELATED APPLICATIONS

The present invention is a national stage of PCT/CN2015/071606, filed Jan. 27, 2015, which claims priority to PCT Patent Application, Serial No. PCT/CN2014/071576, filed on Jan. 27, 2014, entitled "Methods for Motion Parameter Hole Filling". The PCT Patent Application is hereby incorporated by reference in its entirety.

FIELD OF THE INVENTION

The present invention relates to three-dimensional video coding. In particular, the present invention relates to depth coding using motion information inherited from texture pictures in three-dimensional video coding.

BACKGROUND AND RELATED ART

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism. 3D video formats may also include depth maps associated with corresponding texture pictures. The depth maps also have to be coded to rendering three-dimensional view or multi-view.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard (named 3D-HEVC). In 3D-HEVC, a technique named motion parameter inheritance (MPI) has been developed (e.g., Gerhard Tech, et al., "3D-HEVC Draft Text 2", Joint Collaborative Team on 3D Video Coding Extension Development of ITU-T SG 16 WP 3 and ISO/IEC JTC 1/SC 29/WG 11, 6th Meeting: Geneva, CH, 25 Oct.-1 Nov. 2013, Document: JCT3V-F1001) to allow depth maps to inherit motion information from texture pictures. The basic idea behind the MPI mode is that the motion characteristics of the video signal and its associated depth map should be similar, since both correspond to projections of the same scenery from the same viewpoint at the same time instant. In order to enable efficient encoding of the depth map data, the MPI mode is used to allow the depth map data to inherit the coding unit (CU) and prediction unit (PU) partitions and corresponding motion parameters from the corresponding video signal. The motion vectors of the video signal according to HEVC use quarter-sample accuracy. On the other hand, the motion vectors of the depth maps use full-sample accuracy. Therefore, in the inheritance process, the motion vectors of the video signal are quantized to nearest full-sample positions, which can be implemented by a right-shift-by-2 operation. The decision regarding whether to inherit motion information from the video signal or to use own motion information can be made adaptively for each block of the depth map.

The MPI mode can be used in any level of the hierarchical coding-tree block of the depth map. If the MPI mode is indicated at a higher level of the depth map coding tree, the depth map data in this higher level unit can inherit the CU/PU subdivision as well as the corresponding motion data from the video signal. In a more recent development within Joint Collaborative Team on 3D Video Coding Extension, sub-PU (sub-prediction unit) level MPI has been disclosed (Ying Chen, et al., "CE2: Sub-PU based MPI", Joint Collaborative Team on 3D Video Coding Extension Development of ITU-T SG 16 WP 3 and ISO/IEC JTC 1/SC 29/WG 11, 7th Meeting: San Jose, US, 11-17 Jan. 2014, Document: JCT3V-G0119). With the sub-PU level MPI merge candidate, for each sub-PU within current depth PU, the motion parameters of the co-located texture block covering the middle position of current sub-PU are inherited (with a right shift by 2 of the motion vectors) for current sub-PU.

As stated above, the sub-PU MPI derives motion parameters of each sub-PU from the motion parameters of the co-located texture block (reference block) in the same access unit. One set of temporary motion parameters are stored and updated during sub-PU MPI process. For each sub-PU, if motion parameters of the reference block for the current sub-PU are available, temporary motion parameters are updated with the motion parameters of the reference block. Otherwise, if the reference block has no available motion parameters, the temporary motion parameters are copied to the current sub-PU. This process is called the motion parameter hole filling process.

The current sub-PU motion hole filling process uses temporary motion parameters for a sub-PU when the corresponding reference block has no available motion parameter (motion hole). FIG. 1 illustrates an example of motion hole filling according to an existing approach. In this example, the current depth PU (110) is partitioned into 16 sub-PUs. For each sub-PU, the motion parameters of the co-located texture block (120) covering the middle position of each sub-PU are inherited if the motion parameters of the co-located texture block exist. If the motion parameters of the co-located texture block are not available, the co-located texture block has a motion hole. There are two motion holes (block 2 and block 12 as highlighted in filled patterns) in the co-located blocks. If the sub-PUs are processed in a raster scan order as shown in reference 130, the motion hole can be filled by the last available MPI before the motion hole. Accordingly, the motion parameters for sub-PU 2 can be filed using the motion parameters from sub-PU 1, and the motion parameters for sub-PU 12 can be filed using the motion parameters from sub-PU 11. As shown in FIG. 1, to fill the motion hole, the sub-PU motion hole filling process needs to identify the last sub-PU position that has available motion parameters before the motion hole. Therefore, the motion parameters used to fill a motion hole are dependent on the sub-PU processing order, which is not friendly to parallel processing.

BRIEF SUMMARY OF THE INVENTION

A method and apparatus for coding a depth block in three-dimensional video coding are disclosed. Embodiments of the present invention divide a depth block into depth sub-blocks and determine default motion parameters. For each depth sub-block, the motion parameters of a co-located texture block covering the center sample of the depth sub-block are determined. If the motion parameters are available, the motion parameters are assigned as inherited motion parameters for the depth sub-block. If the motion parameters are unavailable, the default motion parameters are assigned as inherited motion parameters for the depth sub-block. The depth sub-block is then encoded or decoded using the inherited motion parameters or a motion candidate selected from a motion candidate set including the inherited motion parameters. The depth block may correspond to a depth prediction unit (PU) and the depth sub-block corresponds to a depth sub-PU. The center sample of the current depth sub-block may correspond to a depth sample in a lower-right quadrant of the current depth sub-block and adjacent to a center point of the current depth sub-block.

The default motion parameters can be determined based on the motion parameters associated with a co-located texture block covering a selected depth sub-block of the multiple depth sub-blocks. For example, the selected depth sub-block of the multiple depth sub-blocks may correspond to a center depth sub-block of the multiple depth sub-blocks located at a lower-right position of the center point of the depth block. The selected depth sub-block of the multiple depth sub-blocks may also correspond to a center depth sub-block of the multiple depth sub-blocks located at a lower-left, upper-left or upper-right position of the center point of the depth block. If both the default motion parameters and the motion parameters of the co-located texture block covering the center sample of the current depth sub-block are unavailable, the inherited motion parameters for the current depth sub-block are set to unavailable.

The default motion parameter can be used as the representative motion parameter for pruning with other merge candidates in 3D-HEVC. Furthermore, the motion candidate set pruning can be disabled if the depth sub-block size is smaller than a threshold.

DETAILED DESCRIPTION OF THE INVENTION

In the conventional 3D-HEVC, the Motion Parameter Inheritance (MPI) hole filling process for a motion hole relies on the last available MPI before the motion hole. Therefore, the motion parameters of a motion hole are dependent on the sub-PU processing order, which is not friendly to parallel processing. To overcome this issue, embodiments of the present invention use default motion parameters for motion hole filling so that motion prediction for each sub-PU can be done in parallel. Furthermore, pruning of motion candidates does not need to wait for all sub-PUs to determine inherited motion parameters. Accordingly, for each sub-PU within the current PU, if its corresponding reference block does not contain available motion parameters, default motion parameters are used for the sub-PU. The motion information associated with a PU or sub-PU includes one or more of the motion vector(s), reference picture index(es), reference picture list(s), etc. The motion information associated with each PU or sub-PU is referred as motion parameters in this disclosure.

Figure 1:
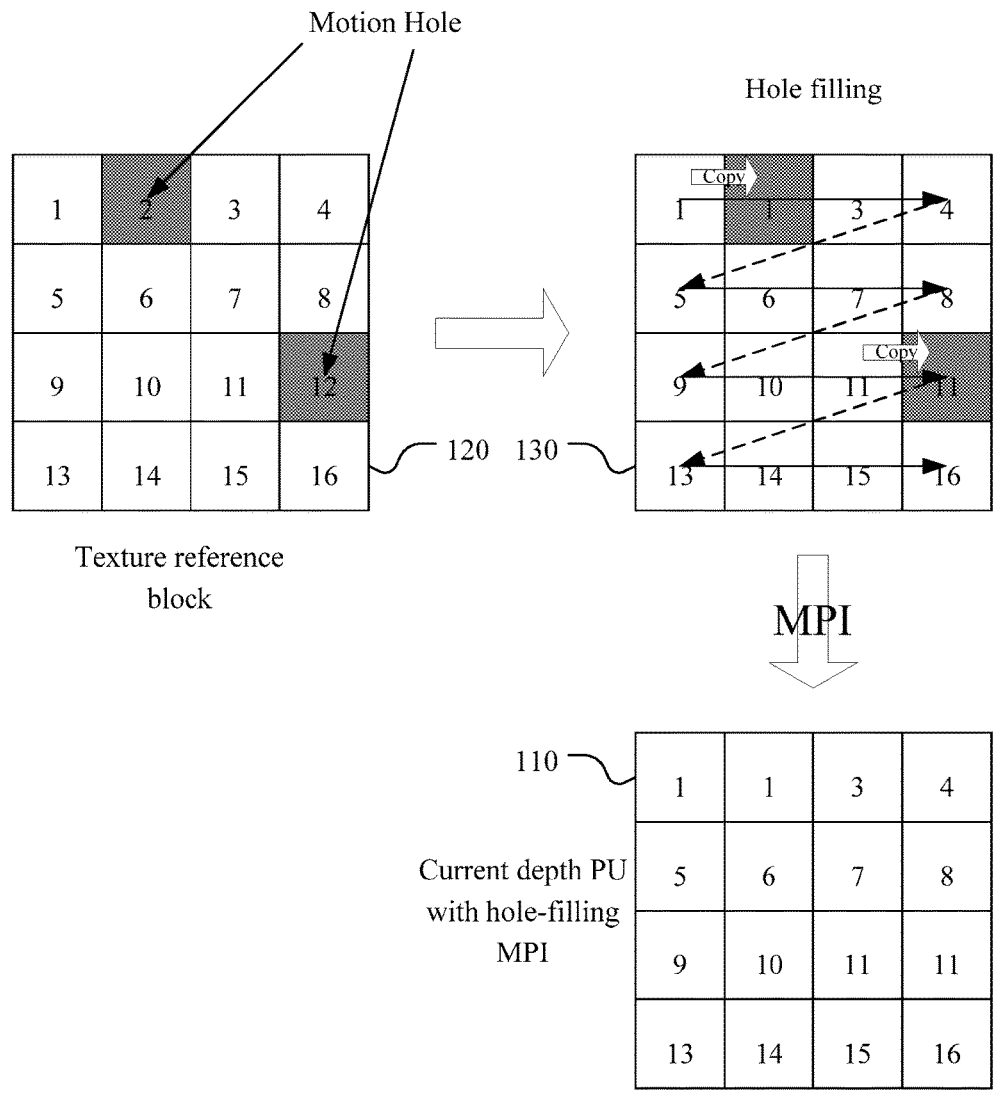
FIG. 1 illustrates an example of motion hole filling process according to the existing three-dimensional video coding based on High Efficiency Video Coding (3D-HEVC).
Figure 2A:
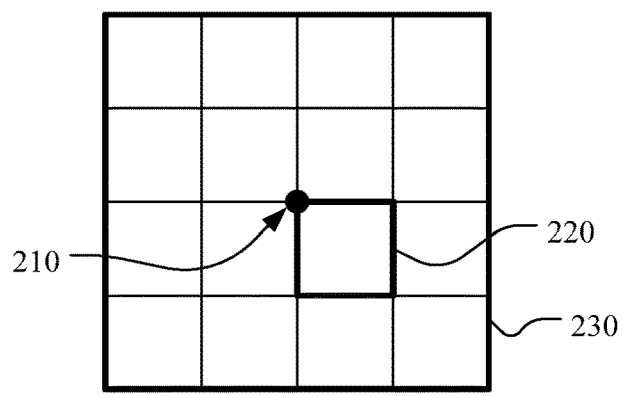
FIG. 2A illustrates an example of motion hole filling process to use the motion parameters of a co-located texture block associated with the center sub-PU corresponding to the sub-PU at a lower-right position of the center point of the PU to determine default motion parameters according to an embodiment of the present invention.

The default motion parameters may be determined according to the motion parameters of the co-located texture reference block associated with a selected depth sub-PU. Furthermore, the co-located texture reference block may correspond to a reference block covering a center sample of the selected depth sub-PU. The selected depth sub-PU may correspond to any sub-PU in the depth PU. However, it is preferred to select a depth sub-PU in the center of the PU. For example, the center sub-PU may correspond to the sub-PU at a lower-right position (220) of the center point (210) of the PU (230) as shown in FIG. 2A. Nevertheless, other center depth sub-PU may also be selected. For example, the center sub-PU of the PU may correspond to the sub-block located in a lower-left, upper-right or upper-left position of the center point (210). In other words, the center sub-PU corresponds to the sub-PU in the respective quadrant and adjacent to the center point (210) of the current PU. While a prediction unit (PU) is used as an example of block structure, other block structure such as coding unit (CU) or macroblock (MB) may also be used.

One example of determining the default motion parameters is disclosed as follows. If the co-located texture block covering the center of a depth PU has available motion parameters, the available motion parameters are used as the default motion parameters. For example, if nPSW and nPSH are the width and height of the PU, and nSubPsW and nSubPsH are the width and height of the sub-PU, the center pixel (xc, yc) can be determined according to:

$$xc = (nPSW/nSubPsW/2)*nSubPsW + nSubPsW/2, \text{ and} \quad (1)$$

$$yc = (nPSH/nSubPsH/2)*nSubPsH + nSubPsH/2. \quad (2)$$

Figure 2B:
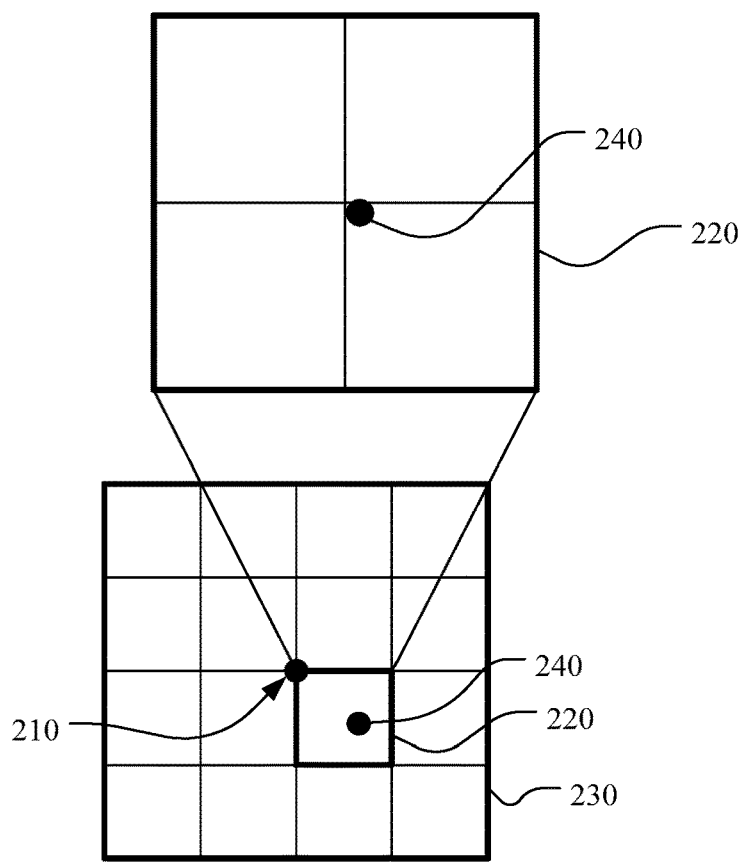
FIG. 2B illustrates an example of the default motion parameter derivation based on motion parameters of the co-located texture block covering the center sample of the sub-PU at a lower-right position of the center point of the PU, where the location of the center sample of the sub-PU corresponds to a lower right sample of the center point of the sub-PU.

FIG. 2B illustrates an example of the default motion parameter derivation based on the motion parameters of the co-located texture block covering the center sample of the sub-PU at a lower-right position of the center point of the PU. The location of the center sample (240) of the sub-PU at a lower-right position (220) of the center point (210) of the PU is determined according to equations (1) and (2). In the example of FIG. 2B, both nPSW/nSubPsW and nPSH/nSubPsH are equal to 4.

If the texture block covering the center pixel has no available motion parameters, the sub_PU MPI process is terminated.

In another embodiment, the motion hole filling process can be dependent on the PU size or CU (coding unit) size. For example, the motion hole filling process will performed only when the PU or CU size is equal to or larger than a threshold. If the PU or CU size is smaller than the threshold, the motion hole filling process is terminated.

The inherited motion parameters can be used for encoding or decoding the depth sub-Pus. The inherited motion parameters may also be used as a motion candidate along with other motion candidates in a candidate set for sub-PUs.

Usually, a pruning process will be applied to the candidate set when a new candidate is added. A final motion candidate may be selected. The final candidate may be used for encoding or decoding of the depth sub-PUs. The final candidate may also be used as a predictor to encode or decode the motion information associated the depth sub-PUs. For example, the final candidate may be used as a Merge candidate to code the motion vector for the depth sub-PU.

The performance of motion parameter inheritance incorporating an embodiment of the present invention is compared with the performance of an anchor system corresponding to JCT3V-G0119. The performance comparison is performed based on different sets of test data. The embodiment of the present invention demonstrates slight improvement in terms of BD-rate, where the BD-rate is a commonly used performance measure in the field of video compression.

Figure 3:
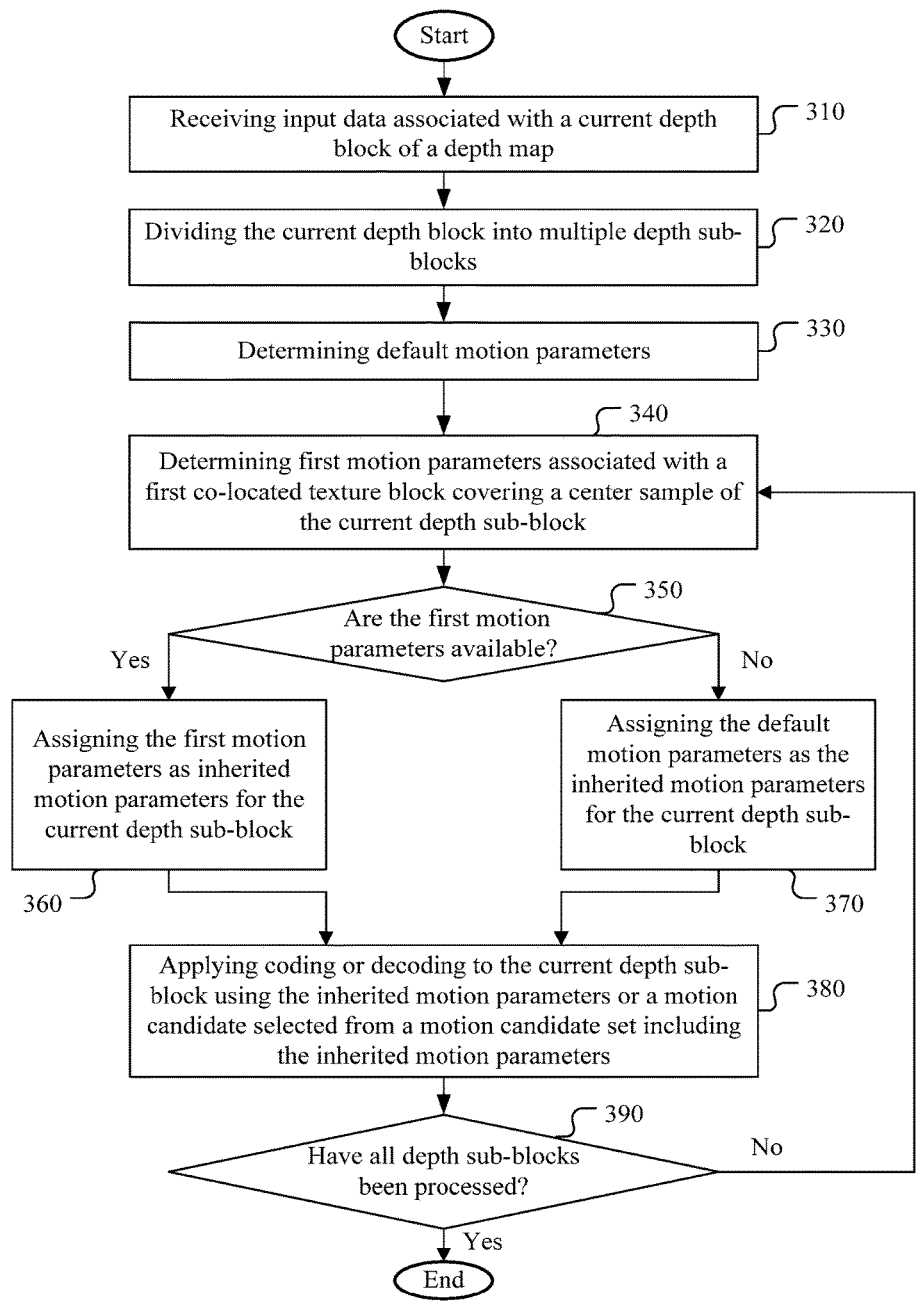
FIG. 3 illustrates an exemplary flowchart of a three-dimensional coding system incorporating default motion parameters for motion hole filling process according to an embodiment of the present invention.

FIG. 3 illustrates an exemplary flowchart for processing a depth block in a three-dimensional coding system incorporating motion information inheritance according to an embodiment of the present invention. The system receives input data associated with a current depth block of a depth map as shown in step 310. At an encoder side, the input data corresponds to the depth block to be coded. At a decoder side, the input data corresponds to coded depth data to be decoded. The input data may be retrieved from storage such as a computer memory, buffer (RAM or DRAM) or other media. The input data may also be received from a processor such as a controller, a central processing unit, a digital signal processor or electronic circuits that derives the input data. The current depth block is divided into multiple depth sub-blocks as shown in step 320 and default motion parameters are determined in step 330. At the encoder side, the encoder may determine how to divide the block into sub-blocks. Information associated with block partition may have to be incorporated in the bitstream so that a decoder may correctly partition the block. Alternatively, the block partition may be pre-defined or determined implicitly so that there is no need to transmit the partition information in the bitstream. The first motion parameters associated with a first co-located texture block covering a center sample of the current depth sub-block are determined as shown in step 340. Since the texture data in the same access unit is coded before the depth data, the motion parameters associated with a corresponding texture block should be processed already. In step 350, a decision is made regarding whether the first motion parameters are available. If the result is "yes", step 360 is performed. If the result is "No", step 370 is performed. In step 360, the first motion parameters are assigned as inherited motion parameters for the current depth sub-block. In step 370, the default motion parameters are assigned as the inherited motion parameters for the current depth sub-block. Then, coding or decoding is applied to the current depth sub-block using the inherited motion parameters or a motion candidate selected from a motion candidate set including the inherited motion parameters as shown in step 380. In step 390, it checks whether all depth sub-blocks have been process. If the result is "Yes", the process for the depth block is terminated. If the result is "No", the process goes to step 340 to process another depth sub-block.

The flowchart shown above is intended to illustrate an example of motion parameter inheritance according to an embodiment of the present invention. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more electronic circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for coding a block in video coding, the method comprising:
   receiving input data associated with a current block;
   dividing the current block into multiple sub-blocks;
   determining a set of default motion parameters or unavailability thereof;
   for a current sub-block:
   determining a first set of motion parameters of a first reference co-located block of the current sub-block or unavailability thereof;
   determining a set of inherited motion parameters for the current sub-block or unavailability thereof, including
   in response to determining that the first set of motion parameters is available, determining the set of inherited motion parameters for the current sub-block according to the first set of motion parameters,
   in response to determining that the first set of motion parameters is unavailable and the set of default motion parameters is available, determining the set of inherited motion parameters for the current sub-block according to the set of default motion parameters, and in response to determining that the first set of motion parameters is unavailable and the set of default motion parameters is unavailable, determining the set of inherited motion parameters for the current sub-block as unavailable; and in response to determining that the set of inherited motion parameters is available, applying coding or decoding to the current sub-block using the set of inherited motion parameters for the current sub-block or a motion candidate selected from a motion candidate set including the set of inherited motion parameters for the current sub-block, wherein the determining the set of default motion parameters or unavailability thereof is performed based on a second co-located reference block of a selected sub-block of the multiple sub-blocks.

2. The method of claim 1, wherein the current block corresponds to a prediction unit (PU) and the current sub-block corresponds to a sub-PU.

3. The method of claim 1, wherein the selected sub-block of the multiple sub-blocks is located in a lower-right quadrant of the current block and adjacent to a center point of the current block.

4. The method of claim 1, wherein the selected sub-block of the multiple sub-blocks is located in a lower-left, upper-right, or upper-left quadrant of the current block and adjacent to a center point of the current block.

5. The method of claim 1, wherein the applying coding or decoding to the current sub-block comprises pruning the motion candidate set.

6. The method of claim 1, wherein the applying coding or decoding to the current sub-block comprises:
disabling pruning of the motion candidate set when a size of the current sub-block is smaller than a threshold size.

7. The method of claim 1, wherein the first co-located reference block corresponds to an area covering a sample in a lower-right quadrant of the current sub-block and adjacent to a center point of the current sub-block.

8. An apparatus for coding a block in a video coding system, the apparatus comprising one or more electronic circuits configured to:
receive input data associated with a current block;
divide the current block into multiple sub-blocks;
determine a set of default motion parameters or unavailability thereof;
for a current sub-block:
determine a first set of motion parameters of a first co-located reference block of the current sub-block or unavailability thereof;
determine a set of inherited motion parameters for the current sub-block or unavailability thereof, including
in response to determining that the first set of motion parameters is available, determining the set of inherited motion parameters for the current sub-block according to the first set of motion parameters, in response to determining that the first set of motion parameters is unavailable and the set of default motion parameters is available, determining the set of inherited motion parameters for the current sub-block according to the set of default motion parameters, and in response to determining that the first set of motion parameters is unavailable and the set of default motion parameters is unavailable, determine the set of inherited motion parameters for the current sub-block as unavailable; and in response to determining that the set of inherited motion parameters is available, apply coding or decoding to the current sub-block using the set of inherited motion parameters for the current sub-block or a motion candidate selected from a motion candidate set including the set of inherited motion parameters for the current sub-block, wherein the one or more electronic circuits are configured to determine the set of default motion parameters or unavailability thereof based on a second co-located reference block of a selected sub-block of the multiple sub-blocks.

9. The apparatus of claim 8, wherein the current block corresponds to a prediction unit (PU) and the current sub-block corresponds to a sub-PU.

10. The apparatus of claim 8, wherein the selected sub-block of the multiple sub-blocks is located in a lower-right quadrant of the current block and adjacent to a center point of the current block.

11. The apparatus of claim 8, wherein the selected sub-block of the multiple sub-blocks is located in a lower-left, upper-right or upper-left quadrant of the current block and adjacent to a center point of the current block.

12. The apparatus of claim 8, wherein the one or more electronic circuits are configured to prune the motion candidate set.

13. The apparatus of claim 8, wherein the one or more electronic circuits are configured to disable pruning of the motion candidate set when a size of the current sub-block is smaller than a threshold size.

14. The apparatus of claim 8, wherein the first co-located reference block corresponds to an area covering a sample in a lower-right quadrant of the current sub-block and adjacent to a center point of the current sub-block.

15. The method of claim 1, wherein the current block is a depth block, and the first reference co-located block and the second co-located reference block are texture blocks.

16. The apparatus of claim 8, wherein the current block is a depth block, and the first reference co-located block and the second co-located reference block are texture blocks.

* * * * *